United States Patent Office 2,931,824
Patented Apr. 5, 1960

2,931,824
THIOPHOSPHORIC ACID ESTERS AND THEIR PRODUCTION

Gerhard Schrader, Wuppertal-Cronenberg, Germany, assignor to Farbenfabriken Bayer Aktiengesellschaft, Leverkusen, Germany, a corporation of Germany No Drawing. Application July 16, 1957
Serial No. 672,109

Claims priority, application Germany July 28, 1956

6 Claims. (Cl. 260—461)

This invention relates to and has as its objects new and useful thiophosphoric acid esters and their production. Generally the new esters of this invention may be represented by the following formula

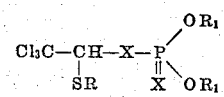

wherein R stands for alkyl or aryl radicals, $R_1$ stands for lower aliphatic radicals, especially such ones having from 1 to 4 carbon atoms, and X stands for either oxygen or sulfur at least one X being sulfur.

Insecticides of the group of thiophosphoric acid esters have become more and more important during the last years. Also many acaricides, miticides and the like or plant-protecting agents belong to the class of phosphoric insecticides.

In accordance with this invention it has now been found that a novel class of phosphorus insecticides consists of compounds of the above shown formula. Their preparation proceeds by methods which are generally known. Thus, if thionophosphates are desired these may be obtained by reacting chloralsemimercaptals with O.O-dialkyl thionophosphoric acid halides or with O.O-dialkyl phosphorous acid halides and subsequently reacting the phosphites obtained with sulfur. These reactions may be seen from the following scheme (in the formulae the symbols R, $R_1$ and X have the same significance as described above):

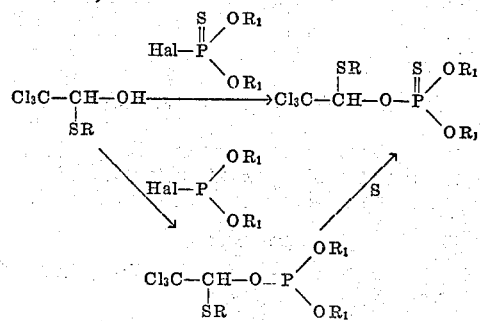

This reaction preferably should be carried out at room temperature or at slightly elevated temperatures in the presence of acid binding agents such as pyridine, dimethyl aniline, triethyl amine, and the like, and in the presence of suitable inert organic solvents. Such inert solvents are preferably benzene, toluene, methyl ethyl ketone, acetone, and the like. If the reaction is carried out with phosphorous acid halides, the second step, namely the reaction with sulfur can be carried out with the raw materials of the first reaction i.e. without isolating them in the same inert solvent. The addition of sulfur proceeds in an exothermic reaction and in larger batches the reaction has to be smoothed by external cooling. The reaction at last is completed generally by warming the mixture for a while.

If thiol- or thionothiol phosphoric acid esters should be obtained the corresponding halides (especially chlorides) to the above said semimercaptals are reacted with salts of O.O-dialkyl thiol- or thionothiol phosphoric acid esters. This reaction may be seen from the following scheme, in which R, $R_1$ and X have the same significance as shown above, and Me stands for alkali metal or ammonium radicals:

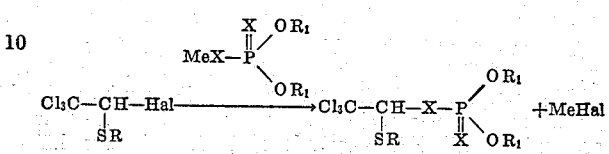

Also this reaction preferably is carried out in the above said inert organic solvents but it is also possible to complete this kind of reaction without any solvent at all.

The compounds of the present invention are generally valuable insecticides and plant-protecting agents. They kill pests such as aphids, flies and mites and exhibit a very remarkable systemic action. Many of the inventive substances also are very effective against caterpillars and other similar insects. The application of these compounds should be carried out according to the use of other known phosphorus insecticides, i.e. in dilution or solution with solid or liquid carriers such as chalk, talk, bentononite, water, alcohols, liquid hydrocarbons etc. The invention compounds may further be used in combination with other known insecticides or pesticides, etc. Effective concentrations of the compounds may vary also; generally concentrations of 0.0001% to 1.0% kill pests effectively. The combinations of the compounds may be sprayed or dusted or otherwise brought in contact with pests or plants to be protected. They may also be used as aerosols.

This special utility of the inventive compounds has been determined with O.O-diethyl-O-(β-trichloro-α-ethylmercapto)-ethyl-thionophosphate of the following formula

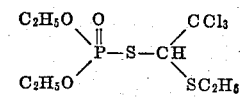

which has been tested against black bean aphids, spider mites, eggs of spider mites, and caterpillars. For that purpose solutions of the above shown compound are prepared by adding the same amount of dimethyl formamide to the active ingredient, then adding 50% by weight (referred to active ingredient) of a commercial emulsifier such as a benzyl hydroxy diphenyl polyglycol ether, and at last diluting this mixture with water. Such aqueous solutions containing 0.01% of active ingredient kill black bean aphids, spider mites and eggs of spider mites completely. Caterpillars are killed completely with 0.1% aqueous solutions.

The following examples are given by way of illustration only, without limiting the present invention thereto.

Example 1

105 grams of the condensation product of 1 mol chloral with 1 mol ethyl mercaptan (colorless needles from ligroin, M.P. 68–69° C.) are dissolved in 250 cc. of toluene. To this solution there are added 42 grams of anhydrous pyridine. While stirring there is added a solution of 80 grams of diethyl phosphoric acid monochloride and 50 cc. of toluene. While cooling the temperature is kept at 30° C. Then there are added at once 16 grams of sulfur. The temperature rises to 60° C. and is kept for another half an hour at 70° C. The reaction product is poured into ice water, to which 20 cc. of diluted hydrochloric acid have been added. Then the toluene solution is washed with a 4% sodium bicarbonate solution, it is dried with sodium sulfate and the solvent is removed by distillation in vacuo. There are obtained 150 grams of the raw ester of the formula

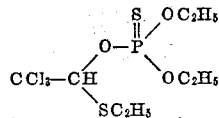

as a yellow water-insoluble viscous oil.

Calc.: for mol weight 361: Cl=29.9%, P=8.4%, S=17.7%. Found: Cl=30.0%, P=8.4%, S=16.1%.

The new ester is distillable only in small portions at a pressure of 0.01 mm. and a temperature of about 100° C.

$DL_{50}$ on rats orally 25 mg./kg. 0.01% solutions kill black bean aphids completely. Even eggs of spider mites are killed with 0.01% solutions, 0.1% solutions kill caterpillars.

Example 2

128 grams of the condensation product of 1 mol chloral and 1 mol phenyl mercaptan (white needles from ligroin, M.P. 59° C.) are dissolved in 200 cc. of toluene. To this toluene solution there are added 42 grams of anhydrous pyridine. At a temperature of 30° C. and while stirring there is added a solution of 80 grams of diethyl phosphorous acid monochloride together with 100 cc. of toluene. After the reaction has slowed down there are added at once 16 grams of sulfur. The temperature rises to about 65° C. and is kept for another half an hour at 70° C. Then the reaction product is worked up as described in Example 1. There are obtained 135 grams of the new ester as a water-insoluble yellow oil. Under a pressure of 0.05 mm. the ester of the following formula distills at a temperature of 140° C.:

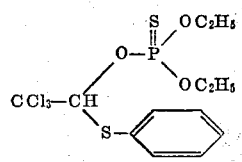

Calc.: for mol weight 409: S=15.6%, P=7.2%. Found: S=16.1%, P=7.7%.

On rats orally the new ester shows a $DL_{50}$ of 25 mg./kg. 0.001% solutions kill flies completely. 0.1% solutions of the ester kill caterpillars 100%.

Example 3

60 grams of the condensation product of 1 mol chloral and 1 mol p-chlorophenyl mercaptan (colorless needles from ligroin, M.P. 72° C.) are dissolved in 100 cc. of toluene. There are added 16 grams of anhydrous pyridine. At a temperature of 30° C. there are added 32 grams of diethyl phosphorous acid monochloride dissolved in 50 cc. of toluene. After this reaction is completed there are added at once 6.4 grams of sulfur. The reaction mixture is warmed to 70° C. for half an hour. The sulfur then is reacted. After working up as usual there are obtained 55 grams of a viscous yellow water-insoluble oil, which distills at a pressure of 0.05 mm. and at a temperature of 160° C.

Calc.: for mol weight 443: Cl=31.8%, S=14.5%, P=6.8%. Found: Cl=32.2%, S=15.1%, P=6.4%.

On rats orally the new ester of the formula

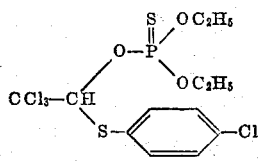

shows a $DL_{50}$ of 100 mg./kg. 0.1% solutions kill caterpillars 100%.

Example 4

82 grams of the condensation product of 1 mol chloral and 1 mol 4.5-dichlorophenyl mercaptan (a viscous and undistillable oil) are dissolved in 100 cc. of toluene. There are added 21 grams of pyridine. At a temperature of 25–30° C. there are added 40 grams of diethyl phosphorous acid monochloride dissolved in 50 cc. of toluene. After the reaction is completed there are added at once 8 grams of sulfur. The reaction product is kept for another half an hour at 70° C. and then worked up as usual. There are obtained 70 grams of the new ester of the formula

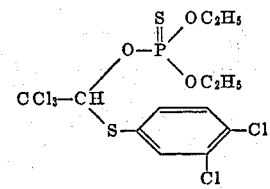

as a viscous yellow water-insoluble oil. The new ester is distillable at a pressure of 0.01 mm. at a temperature of 150° C.

Calc.: for mol weight 478: S=13.4%, P=6.3%. Found: S=14.0%, P=6.6%.

On rats orally the new ester shows a $DL_{50}$ of 50 mg./kg. 0.001% solutions kill flies completely. Spider mites are killed completely with concentrations of 0.01%. Even caterpillars are killed with 0.1% solutions.

Example 5

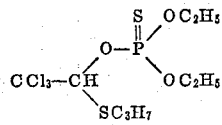

110 grams of the condensation product of chloral and n-propyl mercaptan (M.P. 57° C.) are dissolved in 250 cc. of toluene. To this solution there are added 42 grams of anhydrous pyridine, and while stirring and passing nitrogen through the mixture there are added 80 grams of diethyl phosphorous acid monochloride. The temperature is kept for another half an hour at 30° C. and then while stirring there are added at once 16 grams of sulfur. The reaction temperature rises to about 45° C. The temperature is kept at 70° C. for another hour for completion of the reaction. Then the reaction product is mixed with 200 cc. of ice and to this mixture there are added 20 cc. of concentrated hydrochloric acid. The oily reaction product is taken up in 200 cc. of chloroform. The chloroform solution is washed neutral with a 4% sodium bicarbonate solution and then dried over sodium sulfate. After removing the solvent there are obtained 110 grams of the new ester as a light yellow water-insoluble oil.

Example 6

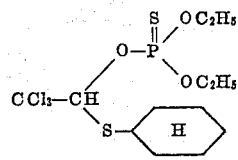

130 grams of the condensation product of 1 mol chloral and 1 mol cyclohexyl mercaptan (M.P. 71° C.) are dissolved in 250 cc. of toluene. To this solution there are added 42 grams of pyridine. Then in a nitrogen stream and while stirring there are added at a temperature of about 30° C. 80 grams of diethyl-phosphorous acid monochloride. The temperature is kept for another half an hour at 30° C. and then there are added 16 grams of finely powdered sulfur. The reaction temperature rises to about 60° C. and the mixture is warmed for another hour at a temperature of 70° C. and then worked up as usual. There are obtained 168 grams of the new ester as a light yellowish water-insoluble oil. At a pressure of 0.01 mm. and a temperature of 120° C. the new ester is distillable but only in small portions.

Example 7

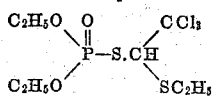

38 grams of the ammonium salt of diethyl thiolphosphoric acid are heated for one hour together with 65 grams of α,β,β,β-tetrachloroethyl ethyl mercaptan (B.P. 0.01 mm./40° C.) at a temperature of 90° C. Then the mixture is filtered with suction to separate from the salts; the filtrate is taken up in chloroform, washed with water and then distilled. There are obtained 28 grams of the new ester (B.P. 0.01 mm./92° C.).

Calc.: for mol 361: S=17.6%, P=8.6%, Cl=26.6%. Found: S=18.1%, P=8.6%, Cl=26.4%.

On rats orally the colorless, scarcely water-soluble ester shows a $DL_{50}$ of 25 mg./kg.

Black bean aphids and spider mites are killed completely in concentrations of 0.01%. In a 0.1% concentration the compound is 100% systemic.

Example 8

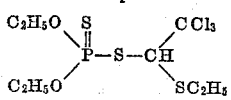

17 grams of caustic potash are dissolved in 50 cc. of water. At a temperature of 25° C. there are added 57 grams of diethyl dithiophosphoric acid. While stirring there are added to this potassium salt solution of the diethyl dithiophosphoric acid 70 grams of α,β,β,β-tetrachloro-diethyl-sulfide at a temperature of about 80° C. This temperature is kept for another hour. Then the reaction product is shaken with chloroform, the chloroform layer is separated, dried over sodium sulfate and then fractionated. There are obtained 37 grams of the above new ester (B.P. 0.01 mm./108° C.).

Calc.: for mol 377: S=25.4%, P=8.2%. Found: S=25.0%, P=8.1%.

On rats orally the colorless ester shows a $DL_{50}$ of 100 mg./kg. 0.1% solutions kill black bean aphids 100%. Mites and flies are also killed completely with 0.1 solutions.

Example 9

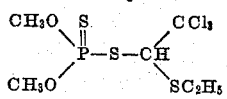

To a concentrated aqueous solution containing 90 grams (½ mol) of the sodium salt of dimethyl dithiophosphoric acid there are added 115 grams of α,β,β,β-tetrachloro-diethylsulfide at a temperature of 65° C. This temperature is kept for a further hour. While stirring, the reaction product is poured into 300 cc. of benzene. The benzene layer is separated and twice washed with 100 cc. of water. After working up as usual there are obtained 115 grams of the new ester, which distills as a colorless water-insoluble oil at a pressure of 0.01 mm. and a temperature of about 111° C.

Calc.: for mol 349: P=8.8%, Cl=30.4%. Found: P=8.8%, Cl=30.5%.

On rats orally the new ester shows a $DL_{50}$ of 500 mg./kg. Aqueous emulsions containing 0.01% of active ingredient kill black bean aphids 100%. 0.1% suspensions show a 100% systemic action.

Example 10

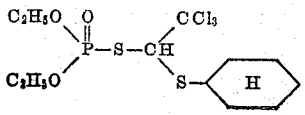

57 grams of α,β,β,β-tetrachloroethyl-cyclohexylthioether (B.P. 0.01 mm./100° C.) are added while stirring and at a temperature of about 60° C. to a solution of 38 grams of the ammonium salt of diethyl-thiolphosphoric acid in 100 cc. of methylethyl ketone. The temperature is kept for half an hour at 60–70° C., cooled to room temperature and the reaction product then is diluted with 300 cc. of water. The oily reaction product is taken up in chloroform, then it is neutralized with a 4% sodium bicarbonate solution and dried over sodium sulfate. There are obtained 40 grams of the new ester, which distills at a pressure of 0.01 mm. and a temperature of about 85° C. The new ester is a colorless water-insoluble oil.

Example 11

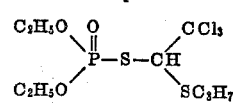

49 grams of α,β,β,β-tetrachloroethyl-thio-n-propylether (B.P. 0.01 mm./95° C.; prepared by chlorination of the condensation product of 1 mol chloral and 1 mol n-propyl-mercaptan) are added while stirring and at a temperature of about 60° C. to a solution of 38 grams of the ammonium salt of diethyl thiolphosphoric acid in 100 cc. of methylethyl ketone. The temperature is kept at 60° C. for half an hour and then cooled to room temperature. The reaction product is diluted with 300 cc. of water and the separated water-insoluble oil is taken up in chloroform. After working up as usual there are obtained 40 grams of the new ester (B.P. 0.05 mm./115°) as a colorless water-insoluble oil.

I claim:

1. A thiophosphoric acid ester of the following formula:

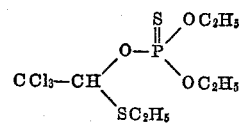

2. A thiophosphoric acid ester of the following formula:

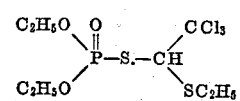

3. A thiophosphoric acid ester of the following formula:

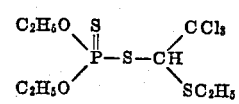

4. A thiophosphoric acid ester of the following formula:

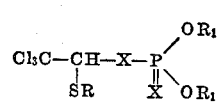

wherein R stands for a member selected from the group consisting of phenyl, chlorophenyl, lower alkyl and cyclohexyl, $R_1$ stands for a lower alkyl radical having from 1 to 4 carbon atoms and X stands for a member selected from the group consisting of oxygen and sulfur, at least one X being sulfur.

5. A thiophosphoric acid ester of the following formula:

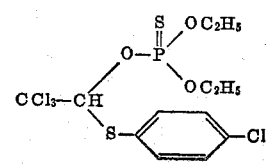

6. A thiophosphoric acid ester of the following formula:
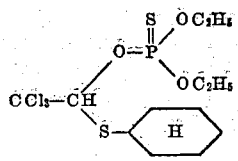
References Cited in the file of this patent
UNITED STATES PATENTS
| | | |
|---|---|---|
| 2,536,647 | Kosalpoff | Jan. 2, 1951 |
| 2,596,076 | Hook et al. | May 6, 1952 |
| 2,811,543 | Coover et al. | Oct. 29, 1957 |
OTHER REFERENCES
Germany, F 16085 IV b/12o, Feb. 23, 1956.